(12) United States Patent
Chapel et al.

(10) Patent No.: US 8,048,525 B2
(45) Date of Patent: Nov. 1, 2011

(54) HYBRID NANOSCALE PARTICLES

(75) Inventors: Jean-Paul Chapel, Bordeaux (FR); Jean-Christophe Castaing, Burlington, NJ (US); Jérôme Fresnais, Massy (FR); Jean-Francois Berret, Chaville (FR); Ling Qi, Orleans (FR)

(73) Assignees: Rhodia, Inc., Cranbury, NJ (US); Centre Nationale de la Recherche Scientifique, Paris (FR)

( * ) Notice: Subject to any disclaimer, the term of this patent is extended or adjusted under 35 U.S.C. 154(b) by 99 days.

(21) Appl. No.: 12/387,829

(22) Filed: May 8, 2009

(65) Prior Publication Data

US 2009/0283711 A1    Nov. 19, 2009

Related U.S. Application Data

(60) Provisional application No. 61/127,109, filed on May 9, 2008.

(51) Int. Cl.
*B32B 5/16* (2006.01)
(52) U.S. Cl. ......... 428/403; 428/407; 427/212; 525/403
(58) Field of Classification Search .................. 525/403; 427/212; 428/403, 407
See application file for complete search history.

(56) References Cited

U.S. PATENT DOCUMENTS

| | | | |
|---|---|---|---|
| 5,344,588 A | 9/1994 | Chane-Ching | |
| 6,153,705 A | 11/2000 | Corpart et al. | |
| 6,783,621 B1 | 8/2004 | Georges et al. | |
| 6,933,340 B2 | 8/2005 | Herve et al. | |
| 7,208,554 B2 * | 4/2007 | Wo et al. .................. | 525/403 |
| 7,235,231 B2 | 6/2007 | Bavouzet et al. | |
| 7,468,413 B2 | 12/2008 | Yokota | |
| 7,495,033 B1 | 2/2009 | Chane-Ching | |
| 2003/0121214 A1 | 7/2003 | Ishibashi | |
| 2004/0029978 A1 | 2/2004 | Chane-Ching | |
| 2005/0176863 A1 | 8/2005 | Yokota et al. | |
| 2006/0167154 A1 | 7/2006 | Bousseau et al. | |
| 2006/0241008 A1* | 10/2006 | Baker et al. ................ | 510/475 |
| 2006/0276371 A1 | 12/2006 | Schreiner et al. | |
| 2008/0248209 A1 | 10/2008 | Chapel et al. | |
| 2009/0163639 A1 | 6/2009 | Berret et al. | |
| 2009/0321660 A1 | 12/2009 | Samuel et al. | |

FOREIGN PATENT DOCUMENTS

| | | |
|---|---|---|
| WO | 9801478 A1 | 1/1998 |
| WO | 9858974 A1 | 12/1998 |
| WO | 03099942 A1 | 12/2003 |
| WO | 2006072743 A2 | 7/2006 |
| WO | 2008008354 A2 | 1/2008 |
| WO | WO2008/008354 * | 1/2008 |
| WO | 0138225 A1 | 5/2010 |

OTHER PUBLICATIONS

Qi et al, Redispersible Hybrid Nanopowders: Cerium Oxide Nanoparticle Complexes with Phosphonated-PEG Oligomers, ACS Nano, May 3, 2008, (abstract)(online, [retrieved on Jun. 26, 2009]. Retrieved from the Internet: <URL: http://pubs.acs.org/doi/abs/10.1021/nn700374d> <DOI: 10.1021/nn700374> <http://arxiv.org/ftp/arxiv/papers/0804.3410.pdf>.
Berret et al. J. Am. Chem. Soc 128 1755-1761 (Jan. 13, 2006).
Yu et al. Colloids and Surfaces A: Physiochem Eng. Aspects 243 (2004) pp. 49-52.
Seghal et al., Precipitation Redispersion of Cerium Oxide Nanoparticles with Poly(acrylic acid): Toward Stable Dispersions (Langmuir 2005, 21, 935909364).
Euliss et al., Cooperative Assembly of Magnetic Nanoparticles and Block Copolypeptides an Aqueous Media (Nano Letters 2003 vol. 3, No. 11, pp. 1489-1493).
Berret et al Soft materials, 2004, vol. 2, Nos. 2&3 pp. 71-84.
U.S. Appl. No. 11/827,343—Advisory Action mailed Jul. 19, 2010.
U.S. Appl. No. 11/827,343—Final Office Action mailed Feb. 2, 2010.
U.S. Appl. No. 11/827,343—Non-final Office Action mailed Jul. 22, 2009.
Quirk et al.—"Experimental Criteria for Living Polymerizations", Polymer International vol. 27, No. 4 (1992) 359-367.
Schmolka—"A Review of Block Polymer Surfactants", Journal of the American Oil Chemists' Society, 1977, vol. 54, 110-116.
Wilczek-Vera et al.—"Individual Block Length Distributions of Block Copolymers of Polystyrene-block-Poly(a-methylstyrene) by MALDI/TOF Mass Spectrometry", Macromolecules 1996, vol. 29, No. 11, 4036-4044. Katayose et al.—Water Soluble Polyion Complex Between DNA and Peg-Poly (L-Lysine) Block Copolymer for Novel Gene Vector, Proceed. Intern. Symp. Control. Rel. Bioact. Mater., 23 (1996) 899-900, Controlled Release Society, Inc.
Office action, mailed Jul. 8, 2011 for U.S. Appl. No. 11/827,343 to Chapel et al. (filed Jul. 11, 2007).

* cited by examiner

*Primary Examiner* — Leszek Kiliman
(74) *Attorney, Agent, or Firm* — Novak Druce + Quigg, LLP

(57) ABSTRACT

An adsorption method includes the step of adsorbing hybrid particles from a colloidal dispersion of such particles at an interface between the dispersion and a second phase, said hybrid particles comprising:
(a) a nanoscale inorganic core having an outer surface, and
(b) an organic layer disposed on at least a portion of the surface of the inorganic core and comprising one or more phosphonates according to structure (I):

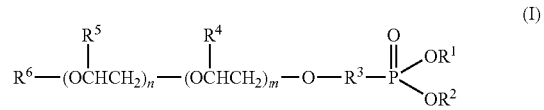

wherein:
$R^1$ and $R^2$ are each independently H, or a $(C_1\text{-}C_{20})$hydrocarbon group,
$R^3$ is a divalent $(C_1\text{-}C_{20})$hydrocarbon group,
$R^4$ and $R^5$ are each independently H or $(C_1\text{-}C_2)$alkyl, provided that $R^4$ differs from $R^5$,
$R^6$ is H or a $(C_1\text{-}C_{30})$hydrocarbon group,
m and n are each independently integers of from 0 to about 200, provided that the sum of m+n is at least 1.

25 Claims, 10 Drawing Sheets

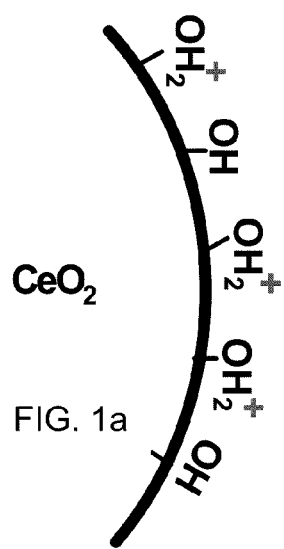
FIG. 1a
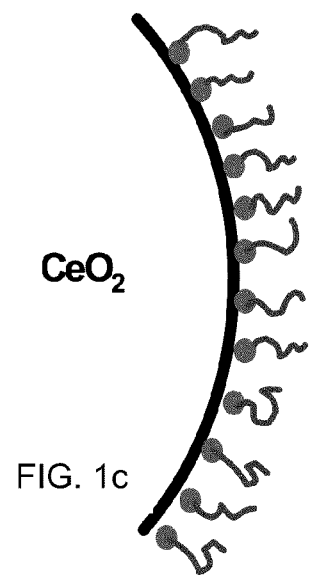
FIG. 1c
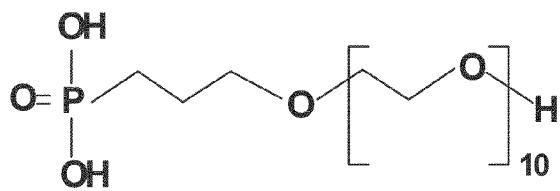
FIG. 1b
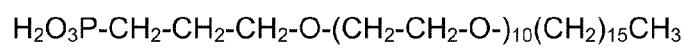

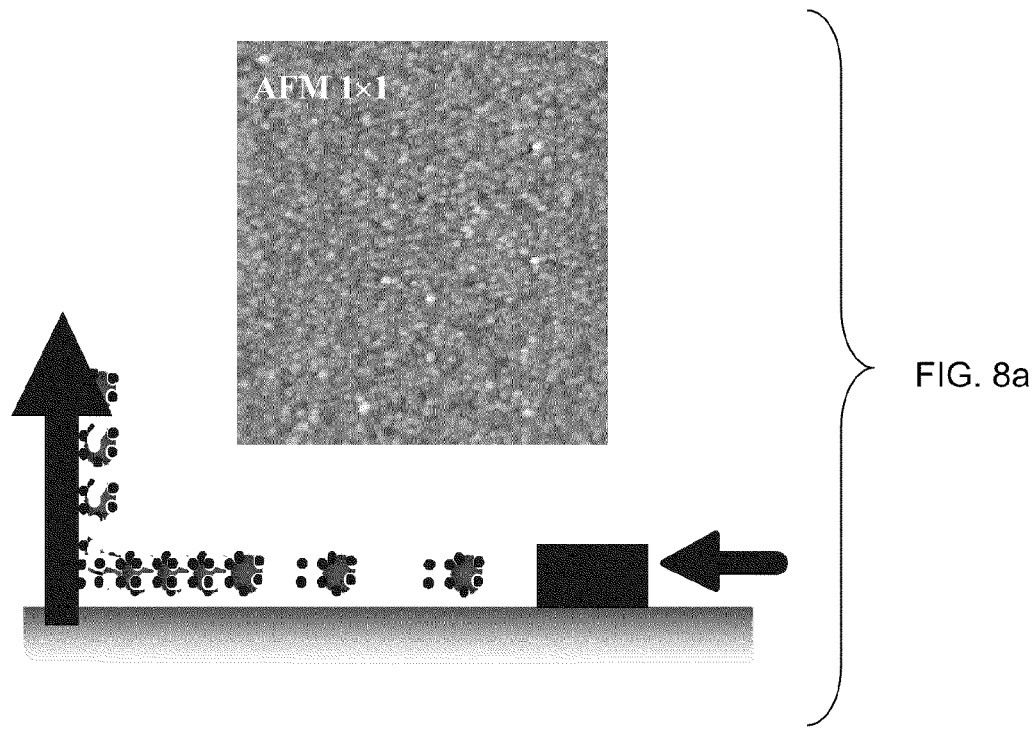
FIG. 8a
FIG. 8b
Deposition of PPAE10-CeO$_2$
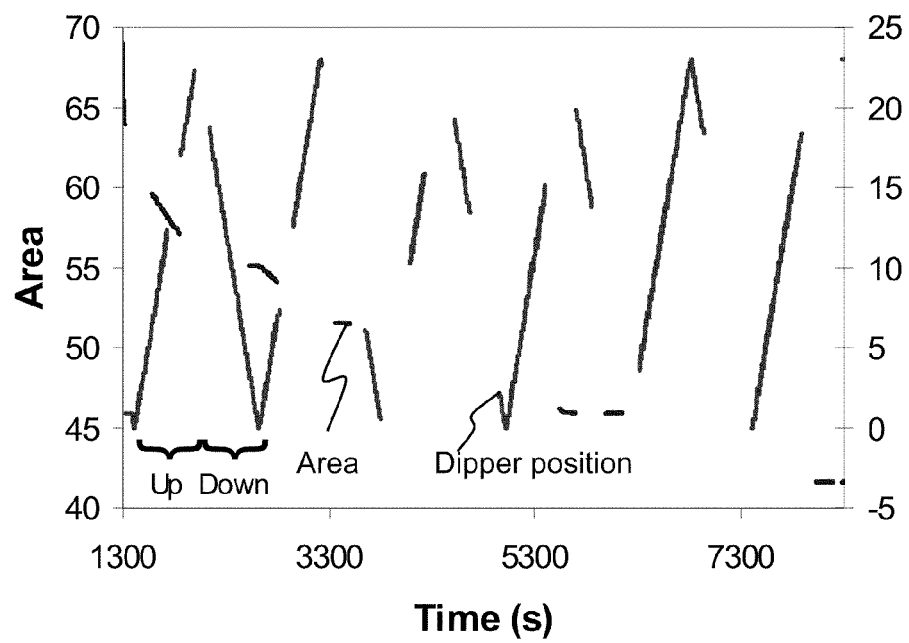

Water / Hexadecane interface

+CeO$_2$-PPEG

FIG. 10a
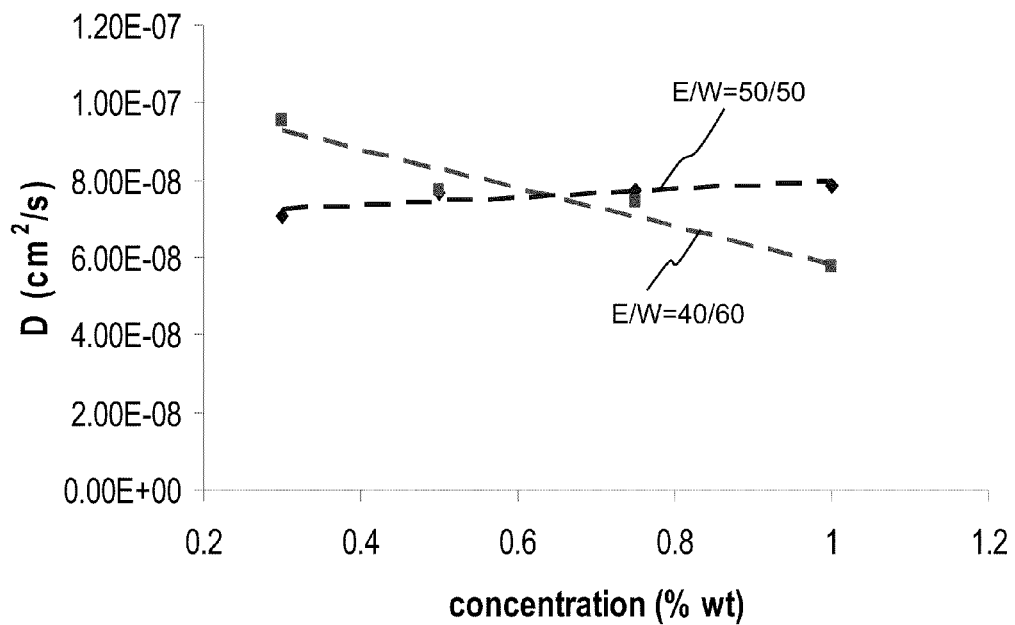
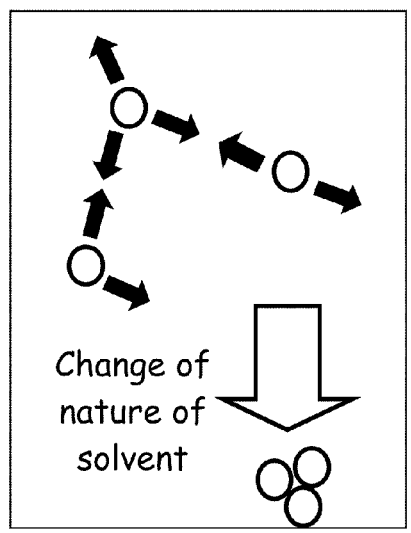
Change of nature of solvent
FIG. 10b

HYBRID NANOSCALE PARTICLES

FIELD OF THE INVENTION

The present invention is directed to hybrid nanoscale particles.

BACKGROUND OF THE INVENTION

The size-dependent properties of nanoparticles have generated diverse interest. Stabilizing inorganic nanosol to physico-chemical perturbation from their "as synthesized" state during processing represents a critical challenge for any given application. The need for stability has been addressed through the adsorption of an organic layer around the particle promoting an electro-steric or steric stabilization of the sol, see, for example, "Mineral Particle Dispersions Stabilized with a Poly(oxyalkylene) Phosphonate", Baker, J. M., et. al., International Publication No. WO 2006/105322 A2, published Oct. 5, 2006.

Further development of uses of such dispersions are now of interest.

SUMMARY OF THE INVENTION

In a first aspect, the present invention is directed to an adsorption method, comprising adsorbing hybrid particles from a colloidal dispersion of such particles at an interface between the dispersion and a second phase, said hybrid particles comprising:
(a) a nanoscale inorganic core having an outer surface, and
(b) an organic layer disposed on at least a portion of the surface of the inorganic core and comprising one or more phosphonates according to structure (I):

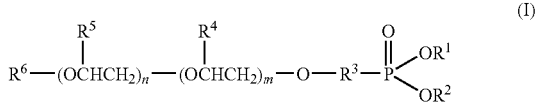

wherein:
  $R^1$ and $R^2$ are each independently H, or a $(C_1$-$C_{20})$hydrocarbon group,
  $R^3$ is a divalent $(C_1$-$C_{20})$hydrocarbon group,
  $R^4$ and $R^5$ are each independently H or $(C_1$-$C_2)$alkyl, provided that $R^4$ differs from $R^5$,
  $R^6$ is H or a $(C_1$-$C_{30})$hydrocarbon group,
  m and n are each independently integers of from 0 to about 200, provided that the sum of m+n is at least 1.

In a second aspect, the present invention is directed to an article, comprising:
(a) a substrate having a surface, and
(b) hybrid particles disposed on at least a portion of the surface of the substrate, said hybrid particles comprising:
  (i) a nanoscale inorganic core having an outer surface, and
  (ii) an organic layer disposed on at least a portion of the surface of the inorganic core and comprising one or more phosphonates according to structure (I):

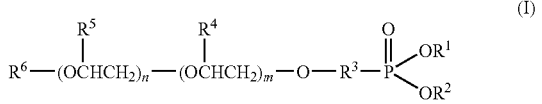

wherein:
  $R^4$ and $R^5$ are each independently H or $(C_1$-$C_2)$alkyl, provided that $R^4$ differs from $R^5$,
  $R^3$ is a divalent $(C_1$-$C_{20})$hydrocarbon group,
  $R^4$ and $R^5$ are each independently H or $(C_1$-$C_2)$alkyl, provided that $R^4$ differs from $R^5$,
  $R^6$ is H or a $(C_1$-$C_{30})$hydrocarbon group,
  m and n are each independently integers of from 0 to about 200, provided that the sum of m+n is at least 1.

In a third aspect, the present invention is directed to an emulsion, comprising:
(a) two immiscible fluid phases, wherein one of said phases is a continuous phase and the other of said phases is a discontinuous phase comprising two or more discrete portions, each bounded by an interface between the portion and the continuous phase and each dispersed in the continuous phase,
(b) hybrid particles dispersed in one of the fluid phases at a first average density and disposed at the interfaces between the two phases in a second average density, said second average density being higher than said first average density and said hybrid particles comprising:
  (i) a nanoscale inorganic core having an outer surface, and
  (ii) an organic layer disposed on at least a portion of the surface of the inorganic core and comprising one or more phosphonates according to structure (I):

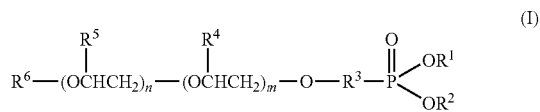

wherein:
  $R^1$ and $R^2$ are each independently H, or a $(C_1$-$C_{20})$ hydrocarbon group,
  $R^3$ is a divalent $(C_1$-$C_{20})$hydrocarbon group,
  $R^4$ and $R^5$ are each independently H or $(C_1$-$C_2)$alkyl, provided that $R^4$ differs from $R^5$,
  $R^6$ is H or a $(C_1$-$C_{30})$hydrocarbon group,
  m and n are each independently integers of from 0 to about 200, provided that the sum of m+n is at least 1.

In a fourth aspect, the present invention is directed to a hybrid particle, comprising:
(a) a nanoscale inorganic core having an outer surface, and
(b) an organic layer disposed on at least a portion of the surface of the inorganic core and comprising at least two phosphonates according to structure (I):

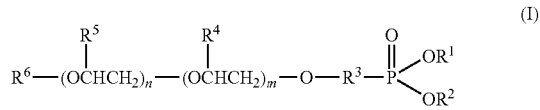

wherein, each case:
  $R^1$ and $R^2$ are each independently H, $(C_1$-$C_{20})$alkyl, $(C_4$-$C_{20})$cycloalkyl, or $(C_6$-$C_{20})$aralkyl,
  $R^3$ is $(C_2$-$C_{20})$alkyl, $(C_4$-$C_{20})$cycloalkyl, or $(C_7$-$C_{20})$ aralkyl,
  $R^4$ and $R^5$ are each independently H or $(C_1$-$C_2)$alkyl, provided that $R^4$ differs from $R^5$, m and n are each independently integers of from 0 to about 200, provided that and the sum of m+n is at least 1, and wherein:
(i) for one of the at least two phosphonates, $R^6$ is H or methyl, and
(ii) for the other of the at least two phosphonates, $R^6$ is a ($C_2$-$C_{30}$)hydrocarbon group.

BRIEF DESCRIPTION OF THE DRAWINGS

FIG. 1a shows a schematic representation of the surface chemistry of cerium oxide nanoscale particles for cationic protonated hydroxyl groups and neutral hydroxyl groups.

FIG. 1b shows tailored chemical architectures (PPEG and Cetyl-PPEG) for the adsorption onto inorganic nanoscale particles.

FIG. 1c shows a PPEG layer supported on a portion of the outer surface of an inorganic nanoscale particle.

FIG. 6a shows original sol before and after freeze-drying and re-dispersion. FIG. 6b shows id. hybrid sol. (X<$X_p$).

FIG. 8a shows multilayer of PEG-functionalized nanoceria via Langmuir-Blodgett deposition at pressure of 20 nm/m monolayers transfer; FIG. 8b shows this was certified by the variation of the trough area during deposition and via thickness measurements (ellipsometry).

FIG. 10a shows the mutual diffusion coefficient D vs. nanoparticle concentration c in ethanol/water mixtures. FIG. 10b shows change of nature of solvent.

DETAILED DESCRIPTION OF INVENTION

Figure 2B:
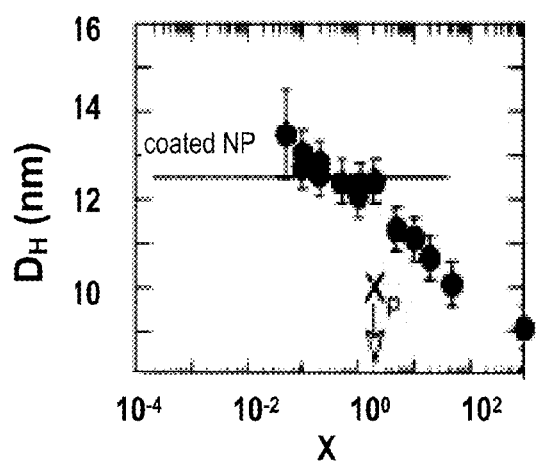
FIGS. 2a and 2b, respectively, shows the Rayleigh ratio and hydrodynamic radius $D_H$ vs. X at low pH (pH=1.5). The continuous line is a fit to the data using a non-stoichiometric model for adsorption.

The term "hybrid", as used herein, in reference to a particle, means that the particle comprises (a) an inorganic core having an outer surface and (b) an organic layer disposed on at least a portion of the surface of the core. The hybrid particles of the present invention typically comprise an inorganic core and a brush-like layer of a phosphonate compound end-grafted onto at least a portion of the surface of the core, more typically, the layer of phosphonate compound surrounds the core.

As used herein, the terminology "($C_x$-$C_y$)" in reference to an organic group, wherein x and y are each integers, indicates that the group may contain from x carbon atoms to y carbon atoms per group.

As used herein, "optionally substituted" in reference to a hydrocarbon group means that the group may, optionally, be substituted on one or more of the carbon atoms with a functional group that is substantially inert under anticipated processing and use condition, such as, unless further limited, either explicitly or by the context of such reference, halo, alkoxy, such as methoxy or ethoxy, aryloxy, such as phenoxy, alkylthio, such as methylthio or ethylthio, arylthio, such as phenylthio, alkylalkoxy, such as methyl methoxy or methyl propoxy, cyano, carboxy, alkoxycarbonyl and perfluoroalkyl, such as trifluoromethyl.

As used herein, "hydrocarbon group" means a group, optionally substituted, having a core structure consisting of carbon and hydrogen atoms.

As used herein, "alkyl" means a saturated optionally substituted straight chain or branched chain hydrocarbon radical, such as for example, methyl, ethyl, n-propyl, iso-propyl, n-butyl, sec-butyl, t-butyl, pentyl, n-hexy and the term "alkylene" means a divalent analog of an alkyl radical, such as, for example, methylene, dimethylene, trimethylene.

As used herein, "cycloalkyl" means a saturated optionally substituted cyclic hydrocarbon radical, such as for example, for example, cyclobutyl, cyclopropyl, cyclohexyl, and cyclopentyl, and "cycloalkylene" means a divalent analog of a cycloalkyl radical.

As used herein, "aryl" means a monovalent, optionally substituted, unsaturated hydrocarbon radical containing one or more six-membered carbon rings in which the unsaturation may be represented by three conjugated double bonds, such as, for example, phenyl, methylphenyl, dimethylphenyl, trimethylphenyl, chlorophenyl, trichloromethylphenyl, and tristyrylphenyl.

As used herein, "aralkyl" means an alkyl radical substituted with one or more aryl radicals, such as, for example, phenylmethyl, phenylethyl, and triphenylmethyl, and "aralkylene" means a divalent analog of an aralkyl radical.

The term "average density" as used herein in reference to particles dispersed in a fluid phase means the average number of particles per unit volume of the bulk fluid phase and, as used herein in reference to particles aligned at an interfacial surface between two phases, means the average number of particles per unit effective volume of a continuous monolayer of particles at the interfacial surface, as calculated by multiplying the area of the interfacial surface times the average diameter of the particles.

The nanoscale inorganic core of the hybrid particles of the present invention are nanoscale inorganic particles of any gross morphology, including amorphous particles and shaped particles, such as spheres, rods, needles, and tubes.

As used herein the term "submicrometic" means that the object has a characteristic maximum dimension of less than 1 micron.

As used herein, the term "nanoscale" in reference to objects means that the characteristic maximum dimension of such objects is at most submicrometic, more typically from about 1 to about 100 nanometers ("nm"), even more typically from about 1 to about 50 nm, and still more typically from about 1 to about 20 nm. As referred to herein, the "characteristic maximum dimension" of a given type of particle, such as for example, the diameter of spherical particle or length of a rod-shaped particle, can be characterized by known means, for example, atomic force microscopy, scanning electron microscopy, or transmission electron microscopy The maximum characteristic dimension of a given type of particle or of a given macromolecule in a liquid medium can be characterized by known means, such as, for example, static and/or dynamic light scattering measurements.

Suitable inorganic particles include metal particles, semiconductor particles, and metal oxide particles.

In one embodiment, the inorganic particles comprise metallic particles. Suitable metal particles, include, for example, gold or platinum particles.

In one embodiment, the inorganic particles comprise particles semiconductor materials. Suitable semiconductor materials include, for example, silicon, silicon carbide, gallium arsenide, indium arsenide, indium phosphide, indium arsenide antimonide, aluminum gallium arsenide nitride, cadmium selenide, cadmium sulfide, lead sulfide, or mercury zinc telluride particles.

In one embodiment, the inorganic particles comprise "quantum dots", that is, nanoscale particles of semiconductor material that confine electrons to a three dimensional potential well. Quantum dots exhibit interesting properties, such as, for example, luminescence, due to the phenomenon of "quantum confinement", that is, confinement of excitons within the volume of the quantum dot particle, see, for example, Reed, Mark S., Quantum Dots, *Scientific American*, pp. 118-123 (January 1993), and Guyot-Sionnest, Philippe, Quantum Dots: A New Quantum State?, *Nature Materials*, Vol. 4, pp. 653-654 (September 2005).

In one embodiment, the nanoscale inorganic particles comprise an inorganic oxide. Suitable inorganic oxides include oxides of single elements, such as cerium oxide, titanium oxide, zirconium oxide, hafnium oxide, tantalum oxide, tungsten oxide and bismuth oxide, zinc oxide, indium oxide, and tin oxide, iron oxide, silica, and mixtures of such oxides, as well as oxides of mixtures of such elements, such as cerium-zirconium oxides. In one embodiment, the inorganic oxide is selected from iron oxide, zirconium oxide, and cerium oxide.

Suitable inorganic particles can be made by known means. For example, methods for making suitable inorganic oxide particles are known, such as sol-gel techniques, direct hydrolysis of metal alkoxides by water addition, forced hydrolysis of metal salts or by reaction of metal alkoxides with metal halides. In one embodiment, the nanoscale inorganic oxide particles are made by precipitation of a cerium salt, as described in U.S. Pat. No. 5,308,548, issued May 3, 1994 to Jean-Yves Chang-Ching for "Preparing a Dispersible, Sol-Forming Cerium (IV) Composition", the disclosure of which is hereby incorporated herein by reference. Methods for making suitable iron oxide nanoscale particles are also known, see Massart, R. C. R. Acad. Sci. (Paris) 1980, 291, 1-3, and Bee, A.; Massart, R.; Neveu, S. J. Magn. Magn. Mat. 1995, 149, 6-9.

The nanoscale inorganic particles may be polyelectrolytic, per se, due, for example, to the presence of linked or absorbed inorganic ions, such as, for example, metal ions, nitrate ions, or may be rendered polyelectrolytic by treatment of the exterior surfaces of nanoscale inorganic particles with, for example, an ionic organic compound, such as acrylic acid, polyacrylic acid, or citric acid, to form ionic organic substituent groups on the exterior surfaces of the nanoscale particles. Suitable surface treatment techniques are know, see, for example, Sehgal, A., Lalatonne, Y., Berret, J-F and Morvan, M., *Langmuir* 21, pp. 9359-9364 (2005). As used herein, the terms "polyelectrolyte" and "polyelectrolytic" each refer to an object having greater than or equal to 2, more typically greater than or equal to 3, even more typically greater than or equal to 4, electrolytic sites per object. As used herein, the term "electrolytic site" means a chemical substituent group, such as for example, a hydroxyl group or quaternary ammonium group, that dissociates in water under the conditions of interest to give ionic species.

In one embodiment, the nanoscale inorganic particles are available in the form of an aqueous colloidal dispersion, also referred to as a "sol", that is stabilized by electrostatic charges and/or hydrostatic forces and subject to destabilization by perturbations of pH, ionic strength, and concentration.

In one embodiment, the inorganic nanoscale particles are cerium oxide particles.

In one embodiment, $R^1$ and $R^2$ are each independently H, or optionally substituted $(C_1-C_{20})$alkyl, $(C_4-C_{20})$cycloalkyl, or $(C_7-C_{20})$aralkyl, more typically H, or optionally substituted $(C_1-C_{10})$alkyl, $(C_4-C_{10})$cycloalkyl, or $(C_7-C_{12})$aralkyl.

In one embodiment, $R^3$ is optionally substituted $(C_2-C_{20})$alkylene, $(C_4-C_{20})$cycloalkylene, or $(C_8-C_{20})$aralkylene, more typically optionally substituted $(C_1-C_{10})$alkylene, and even more typically methylene or dimethylene.

In one embodiment, $R^4$ and $R^5$ are each H or methyl, provided that $R^4$ differs from $R^5$. In one embodiment, $R^4$ is methyl and $R^5$ is H. In one embodiment, m is 0 and $R^5$ is H or methyl. In one embodiment, m is 0 and $R^5$ is H.

In one embodiment, $R^6$ is H or optionally substituted $(C_1-C_{30})$alkyl, $(C_4-C_{30})$cycloalkyl, or $(C_6-C_{30})$aralkyl. In one embodiment, $R^6$ is H or optionally substituted $(C_1-C_{30})$alkyl.

In one embodiment, $R^6$ is H or methyl.

In one embodiment, $R^6$ is a $(C_2-C_{30})$hydrocarbon group, more typically, $(C_2-C_{30})$alkyl, $(C_3-C_{30})$cycloalkyl, or $(C_6-C_{30})$aralkyl, even more typically $(C_4-C_{30})$alkyl, and still more typically, $(C_8-C_{20})$alkyl.

In one embodiment, m and n are each independently integers of from 0 to about 200, more typically from 0 to about 100, and even more typically from 0 to about 50, provided that the sum of m+n is at least 1, more typically at least 2, and even more typically at least 4, even more typically at least 5.

In one embodiment, m is 0 and n is an integer of from 1 to about 200, more typically from 4 to about 50, and even more typically from 5 to about 20.

In one embodiment, $R^6$ is H or methyl and the sum of m+n is from about 5 to about 20. More typically, $R^6$ is H or methyl, $R^5$ is H, m is 0, n is from about 5 to about 20.

In one embodiment, $R^6$ is a $(C_2-C_{30})$hydrocarbon group, more typically, $(C_2-C_{30})$alkyl, $(C_3-C_{30})$cycloalkyl, or $(C_6-C_{30})$aralkyl, even more typically $(C_4-C_{30})$alkyl, and still more typically, $(C_8-C_{20})$alkyl, and the sum of m+n is from about 5 to about 20. More typically $R^6$ is $(C_4-C_{30})$alkyl, still more typically, $(C_8-C_{20})$alkyl, $R^6$ is H or methyl, $R^5$ is H, m is 0, n is from about 5 to about 20.

In one embodiment $R^1$ and $R^2$ are each independently H, or optionally substituted $(C_1-C_{20})$alkyl, $(C_4-C_{20})$cycloalkyl, or $(C_7-C_{20})$aralkyl, $R_3$ is $(C_2-C_{20})$alkylene, $(C_4-C_{20})$cycloalkylene, or $(C_7-C_{20})$aralkylene, $R^3$ is optionally substituted $(C_2-C_{20})$alkylene, $(C_4-C_{20})$cycloalkylene, or $(C_8-C_{20})$aralkylene, $R^4$ and $R^5$ are each independently H or optionally substituted $(C_1-C_2)$alkyl, $R^6$ is H, $(C_1-C_{20})$alkyl, $(C_4-C_{20})$cycloalkyl, or $(C_7-C_{20})$aralkyl, and m and n are each independently integers of from 0 to about 200, provided that the sum of m+n is at least 1, more typically at least 5.

In one embodiment, $R^1$ and $R^2$ are each independently H, $(C_1-C_{10})$alkyl, $(C_4-C_{10})$cycloalkyl, or $(C_7-C_{12})$aralkyl.

$R^3$ is $(C_1-C_{10})$alkylene, $R^4$ and $R^5$ are each independently H or $(C_1-C_2)$alkyl, $R^6$ is H or $(C_1-C_{30})$alkyl, m and n are each independently integers of from 0 to about 100, provided that the sum of m+n is at least 1, more typically at least 5.

In one embodiment, $R^1$ and $R^2$ are each independently H, or $(C_1-C_{10})$alkyl, $R^3$ is methylene, dimethylene, or trimethylene.

$R^4$ and $R_5$ are independently H or $(C_1-C_2)$alkyl, $R^6$ is H or $(C_1-C_{30})$alkyl, and m and n are each independently integers of from 0 to about 50, provided that the sum of m+n is at least 1, more typically at least 5.

In one embodiment, the organic layer of the hybrid particle comprises at least two different phosphonates according to structure (I). In one embodiment, the organic layer of the hybrid particle comprises at least two different phosphonates according to structure (I) that differ with respect to the $R^6$ substituent. In one embodiment, the organic layer of the hybrid particle comprises at least two different phosphonates according to structure (I) that differ with respect to the sum of m+n. In one embodiment, the organic layer of the hybrid particle comprises at least two different phosphonates according to structure (I) that differ with respect to the $R^6$ substituent and with respect to the sum of m+n.

In one embodiment, the phosphonate of formula (I) is synthesized by reacting a polyalkylene glycol alkenyl ether of the general structure of formula (III) with a phosphite having the general structure of formula (IV) according to reaction Scheme I:

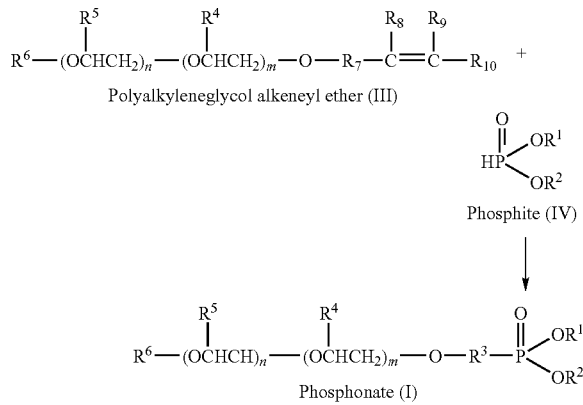

wherein $R^1$, $R^2$, $R^3$, $R^4$, $R^5$, $R^6$, m, and n are each as described with respect to formula (I) above, $R^7$, $R^8$, $R^9$, and $R^{10}$ are each independently H, $(C_1-C_{20})$alkyl, $(C_4-C_{20})$cycloalkyl, or $(C_6-C_{20})$aralkyl, and

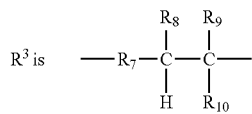

In one embodiment, $R^7$, $R^8$, $R^9$, and $R^{10}$ are each independently H, $C_1-C_1$)alkyl, $(C_4-C_{10})$cycloalkyl, or $(C_6-C_{12})$aralkyl.

The $R^1$, $R^2$, $R^6$, $R^7$, $R^8$, $R^9$, and $R^{10}$ substituents may, optionally, each be substituted with one or more functional groups which are relatively non-reactive with the reactants, products, and additives employed in the process under process conditions. Illustrative of such non-reactive functional groups are phenyl, chloro, bromo, alkoxy, aryloxy, alkylthio, arylthio, alkylalkoxy, (e.g., methyl methoxy, methyl ethoxy, and methyl propoxy), cyano, carboxy, alkoxycarbonyl, perfluoroalkyl (e.g., trifluoromethyl).

In one embodiment of the polyalkylene glycol alkenyl ether reactant (III), $R^6$ is H and $R^{10}$ is alkenyl. In another embodiment of the polyalkylene glycol alkenyl ether starting reactant (III), $R^6$ is alkyl, cycloalkyl, or aralkyl and $R^{10}$ is alkenyl. In each case, the polyalkylene oxide portion of the compound can consist of homopolymeric chains derived from of ethylene oxide, propylene oxide, or butylene oxide, or copolymeric chains, in which the monomeric units may be arranged randomly or in blocks, derived from two or more of those monomers.

Examples of the polyalkylene glycol alkenyl ether reactants include: polyethylene glycol allyl ether (MW 498), polyethylene glycol allyl ether (20 mols EO, 5 mols PO), polyethylene glycol allyl methyl ether (MW 250), polyethylene glycol allyl methyl ether (MW 350), polyethylene glycol allyl methyl ether (MW 500), polyethylene glycol allyl methyl ether (MW 1100), polyethylene glycol allyl methyl ether (20 mols EO, 20 mols PO), polyethylene glycol allyl butyl ether (25 mols EO, 8 mols PO), polyethylene glycol vinyl ether (MW 440), and polyethylene glycol vinyl methyl ether (MW 456).

Examples of the phosphite reactant (IV) include phosphorous acid, monoalkyl or monoaryl hydrogen phosphite such as monomethyl hydrogen phosphite, monoethyl hydrogen phosphite, monophenyl hydrogen phosphite, and dialkyl hydrogen phosphite such as dimethyl hydrogen phosphite, diethyl hydrogen phosphite, diisopropyl hydrogen phosphite, dibutyl hydrogen phosphite, and diphenyl hydrogen phosphite, and mixed esters such as methyl ethyl hydrogen phosphite. Dialkyl hydrogen phosphites are preferred due to their high reactivity compared to the other phosphites. Preferable dialkyl hydrogen phosphites include dimethyl hydrogen phosphite and diethyl hydrogen phosphite.

The synthesis reaction may be carried out in the absence of solvent or in a solvent, such as water, an organic solvent, a mixture of organic solvents, or a mixture of water and one or more organic solvents, typically water miscible organic solvents. Typically, the synthesis reaction is conducted in a polar organic solvent, such as for example, nitrogenous type compounds, such as ethylene diamine, NMP (N-methylpyrrolidone), pyridine, MEA (monoethanolamine), diethanolamine, triethanolamine, tert-butyl diethanolamine, isopropanolamine, 2-amino-1-propanolamine, 3-amino-1-propanolamine, isobutanolamine, 2-amino-2-ethoxyethanol, DGA [diglycolamine or 2-(2-aminoethoxy)ethanol], alcohol and/or ether and/or ester type compounds such as: ethanol, propanol, butanol, ethyl acetate, propyl acetate, butyl acetate, ethylene glycol, propylene glycol, TEG [triethylene glycol], glyme, diglyme, PGMEA [propylene glycol monomethyl ether acetate or 2-(1-methoxy)propyl acetate], PGME [propylene glycol monomethylether], ethyl lactate, anisole, methyl adipate, cyclopentanol, hydrocarbon type compounds such as toluene, xylene, mesitylene, ketone type compounds such as acetone, dimethyl ketone, methyl ethyl ketone, 2-pentanone, cyclopentanone, cyclohexanone, and mesityl oxide, and dimethyl sulphoxide.

The synthesis reaction is typically carried out in the presence of a free radical initiator. Typical initiators are known in the art and include, for example, di-tbutyl peroxide, dibenzoyl peroxide, 2,2'-azobisisobutyronitrile (AIBN), and sodium persulfate.

The synthesis reaction temperature employed in the preparation process can be varied widely depending on factors known to those skilled in the art. The reaction is typically carried out at a temperature greater than 60° C. more typically from about 60° C. to about 160° C. and even more typically from about 80° C. to about 140° C.

The synthesis reaction may be carried out at atmospheric pressure or above atmospheric pressure in a sealed vessel. For convenience, and to ease removal of certain by-products during the reaction if so desired, the reaction is typically carried out above atmospheric pressure.

The synthesis reaction is conducted for a period of time sufficient to produce the desired compound in adequate yield. Reaction times are influenced to a significant degree by the choice of radical initiator, the reaction temperature, the concentration and choice of reactants, and other factors known to those skilled in the art. In general, reaction times may vary from a few hours to several days or longer.

The synthesis reaction can be conducted in a batch, semi-continuous or continuous fashion. The synthesis reaction can be conducted in a single reaction zone or in a plurality of reaction zones, in series or in parallel, or it may be conducted intermittently or continuously in an elongated tubular zone or series of such zones. The materials of construction employed should be inert to the reactants during the reaction and the equipment should be fabricated such that it is able to withstand the reaction temperatures and pressures.

When $R^6$ of the polyalkylene glycol alkenyl ether reactant (III) is H, it may be necessary to protect the hydroxyl moiety to prevent the undesired esterification or transesterification reaction between the hydroxyl group and the phosphite (IV). Suitable protective groups, which are subsequently easily removed, are known in the art. In one embodiment, acetic anhydride is used as the protective compound as outlined below in Scheme II, wherein $R^1$, $R^2$, $R^3$, $R^4$, $R^5$, $R^6$, $R^7$, $R^8$, $R^9$, and $R^{10}$, m, and n are each as described above.

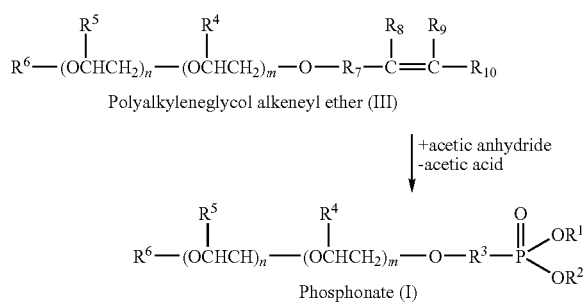

In one embodiment, a hybrid particle dispersion is formed by mixing the phosphonate of formula (I) with inorganic nanoscale particles in a liquid medium. Suitable liquid media include aqueous liquid media and organic liquid media. Suitable aqueous liquid media include water and mixtures of water with one or more water miscible organic liquids, such as for example, ethanol, propanol, butanol, ethylene glycol, propylene glycol, triethylene glycol, or cyclopentanol.

In one embodiment, the dispersion is in an aqueous medium and exhibits a pH of between 1 and 10.

In one embodiment, the hybrid particles of the dispersion have an average characteristic maximum dimension that is less than about 5000 nm, more typically, less than about 200 nm.

In one embodiment, the colloidal dispersion of hybrid particles in a liquid medium comprises from greater than 0 to about 25 parts by weight ("pbw"), more typically from greater than 0 to about 10 pbw, and even more typically from about 0.01 to about 5 pbw hybrid particles and from about 75 to less than 100 pbw, more typically from about 90 to less than 100 pbw, and even more typically from about 95 to about 99.99 pbw of the liquid medium per 100 pbw of the dispersion.

In one embodiment, the phosphonate and the inorganic nanoscale particles of the hybrid particles are present in a relative amount of from greater than 0 to about 10 pbw, more typically, from about 0.01 to about 5 pbw of the phosphonate per 100 pbw of the inorganic nanoscale particles.

It is believed that the phosphonate group of the phosphonate according to structure (I) strongly anchors the phosphate according to structure (I) to the surface of the inorganic nanoscale particles, resulting in a hybrid morphology comprising an inorganic nanoscale core derived from the inorganic nanoscale particles, and an organic layer, derived from the phosphonate according to structure (I) in the form of an end-grafted brush-like layer of electrically neutral bristles supported on and extending from the surface of the inorganic core.

Selecting from among the various permutations of the phosphonate of structure (I) allows tuning of the properties, such as interfacial activity, of the hybrid particles. The interfacial activity properties are particularly sensitive to the selection of the $R^6$ substituent of the phosphonate of structure (I) and the number of oxyalkylene units, i.e., the sum of m+n, of the phosphonate of structure (I).

In one embodiment, the phosphonate is soluble in the liquid medium of the colloidal dispersion of hybrid particles and tends to render the hybrid particle more readily dispersible in the liquid medium of the colloidal dispersion of hybrid particles. In one embodiment, the $R^6$ substituent of the phosphonate of structure (I) is H or methyl, more typically the $R^6$ substituent of the phosphonate of structure (I) is H or methyl and the sum of m+n is at least 4, more typically from about 5 to about 20, and the presence of such phosphonate in the layer of the hybrid particle tends to render the hybrid particle more readily dispersible in aqueous media.

In one embodiment, the organic layer of the hybrid particle comprises at least two phosphonates according to structure (I), wherein one of the at least two phosphonates is a water soluble phosphonate compound in which $R^6$ is H or methyl, and the other of the at least two phosphonates is a surface active compound in which $R^6$ is a hydrophobic group, such as a ($C_2$-$C_{30}$)hydrocarbon group, wherein the number of carbon atoms in the $R^6$ substituent and the number of oxyalkylene units of the phosphonate are each selected to provide a phosphonate having a desired degree of surface activity. In one embodiment, at least two phosphonates according to structure (I) are used wherein for one of the at least two phosphonates is a water soluble phosphonate compound in which $R^6$ is H or methyl, and for the other of the at least two phosphonates is a surface active phosphonate compound in which $R^6$ is a hydrophobic group, such as a ($C_2$-$C_{30}$)hydrocarbon, and the number of carbon atoms in the $R^6$ substituent and the number of oxyalkylene units of the phosphonate are each selected to provide a phosphonate having a desired degree of surface activity. Selecting the relative amounts of the two types of phosphonates present in the layer of a hybrid particle allows the interfacial properties of the hybrid particle to be adjusted.

In one embodiment, the organic layer of the hybrid particles comprise at least two phosphonates according to structure (I), wherein:

one of the at least two phosphonates is a water soluble phosphonate wherein $R^6$ is H or methyl, more typically wherein $R^6$ is H or methyl and m+n is greater than or equal to 4, more typically from about 5 to about 20, and the other of the at least two phosphonates is a surface active phosphonate compound, wherein $R^6$ is $(C_2-C_{30})$hydrocarbon group, more typically, wherein $R^6$ is $(C_2-C_{30})$hydrocarbon group, more typically $(C_2-C_{30})$alkyl, and even more typically $(C_8-C_{20})$alkyl, and m+n is greater than or equal to 4, more typically from about 5 to about 20.

In one embodiment, the concentration of a surface active phosphonate compound according to structure (i) in a liquid medium for treating inorganic nanoscale particles is limited to less than the concentration at which such compound begins to spontaneously aggregate in the liquid medium. In the case of an aqueous liquid medium, such limit is typically referred to as the critical micelle concentration for the surface active compound. In one embodiment, the organic layer of the hybrid particle of the present invention comprises a surface active phosphonate according to structure (I) having a critical micelle concentration in pure water of from greater than 0 to about 0.5 millimolar ("mM"), more typically greater than 0 to about 0.2 mM, and the hybrid particle dispersion is formed by mixing inorganic nanoscale particles and phosphonate compounds according to structure (I) in an aqueous medium, wherein the phosphonate compounds comprise at least one surface active phosphonate compound that has a non-zero critical micelle concentration in water and that is at least initially present in the aqueous medium at a concentration of from greater than 0 to less than the critical micelle concentration in that aqueous medium for that phosphonate compound. It should be noted that the varying composition of the aqueous medium changes the critical micelle concentration of the surface active phosphonate compound, for example, increasing the amount of water miscible organic liquid, such as a water miscible alcohol, in the aqueous medium tends to increase the critical micelle concentration of the surface active phosphonate compound in that aqueous medium.

In one embodiment, the organic layer of the hybrid particles comprises:

from about 95 to less than 100 percent by weight (wt %), more typically from about from about 98 to less than 100 wt % of water soluble phosphonates according to structure (I), wherein $R^6$ is H or methyl, more typically wherein m+n is greater than or equal to 4 and $R^6$ is H or methyl, and from greater than 0 to about 5 wt %, more typically, from greater than 0 to about 2 wt %, of surface active phosphonates according to structure (I) wherein $R^6$ is $(C_2-C_{30})$hydrocarbon group, more typically, wherein m+n is greater than or equal to 4 and $R^6$ is $(C_2-C_{30})$hydrocarbon group, more typically $(C_2-C_{30})$alkyl, even more typically $(C_8-C_{20})$alkyl.

In one embodiment, the colloidal dispersion of hybrid particles is dried, typically freeze-dried, to form a dry powder. The dry hybrid particles are re-dispersible in an aqueous or organic liquid medium, such as ethanol, acetone, and chloroform, to form a colloidal dispersion of hybrid particles. Suitable aqueous media include mixture of water with water miscible organic solvents.

In one embodiment of the adsorption process of the present invention, the second phase is a fluid phase. The fluid phase may be a gas phase or a liquid phase that is immiscible with the liquid medium of the colloidal dispersion of hybrid particles.

In one embodiment of the adsorption method of the present invention, the second phase is a gas phase. The gas phase may be a continuous phase that interfaces with the colloidal dispersion of hybrid particles at a surface of a volume of the colloidal dispersion or discontinuous phase dispersed in the colloidal dispersion of hybrid particles.

Any gas is suitable as the gas phase. In one embodiment, the gas comprises oxygen, nitrogen, or a mixture thereof. In one embodiment, the gas comprises ambient air.

In one embodiment, the liquid medium of the colloidal dispersion of hybrid particles and the gas phase are each continuous phases that interface at a surface of a volume of the colloidal dispersion, for example, the upper surface of a volume of the dispersion that is contained within a reservoir. In the case of an interface at the upper surface of a volume of colloidal dispersion of the hybrid particles, the hybrid particles tend to adsorb at the upper surface of the volume of colloidal dispersion to form a layer of increased hybrid particle density, relative to the hybrid particle density of the dispersion, at the upper surface of the volume of colloidal dispersion. The density of such a hybrid particle layer can be further increased by, for example, mechanically sweeping and confining the layer within a reduced surface area.

In one embodiment, the liquid medium of the colloidal dispersion of hybrid particles is a continuous phase, the gas phase is a discontinuous phase dispersed in the colloidal dispersion, and interfaces between the colloidal dispersion and the gas phase are defined at the surfaces of bubbles of the gas phase dispersed in the colloidal dispersion of hybrid particles. In such a case, the hybrid particles tend to adsorb at the surfaces of the gas bubbles to form an interlayer of increased hybrid particle density, relative to the hybrid particle density of the dispersion, at the interfaces between the colloidal dispersion and each of the gas bubbles. In one embodiment, the colloidal dispersion, dispersed gas bubbles, and hybrid particle interlayers form a gas in liquid emulsion. In one embodiment, the hybrid particle layers stabilize the gas in liquid emulsion. In one embodiment, the gas in liquid emulsion is an aqueous foam.

In one embodiment, the gas phase is a continuous phase, the liquid medium of the colloidal dispersion of hybrid particles phase is a discontinuous phase dispersed in the gas phase, and interfaces between the colloidal dispersion and the gas phase are defined at the surfaces of dispersed droplets of the colloidal dispersion in the gas phase. In such a case, the hybrid particles tend to adsorb at the surfaces of the droplets of the colloidal dispersion to form an interlayer of increased hybrid particle density, relative to the hybrid particle density of the dispersion, at the interfaces between the gas phase and each of the droplets of the colloidal dispersion. In one embodiment, the gas phase, dispersed droplets of colloidal dispersion, and hybrid particle interlayers form a liquid in gas emulsion emulsion. In one embodiment, the hybrid particle layers stabilize the liquid in gas emulsion.

In one embodiment of the adsorption method of the present invention, the second phase is a liquid phase that is immiscible with the liquid medium of the colloidal dispersion of hybrid particles. The second liquid phase may be a continuous phase or discontinuous phase.

Any liquid is suitable as the second liquid phase. In one embodiment, the liquid medium of the dispersion of hybrid particles is an aqueous medium and the second liquid phase is a water immiscible liquid, such as a water immiscible liquid, such as, for example, a hydrocarbon oil. In one embodiment, the liquid medium of the dispersion of hybrid particles is a water immiscible liquid medium and the second liquid phase is an aqueous liquid.

In one embodiment, the liquid medium of the colloidal dispersion of hybrid particles and the second liquid phase are each continuous phases that interface at a surface of a volume of the colloidal dispersion, for example, the upper surface of volume of the dispersion that is contained within a reservoir. In the case of an interface at the upper surface of a volume of the colloidal dispersion of the hybrid particles, the hybrid particles tend to adsorb at the upper surface of the volume of the colloidal dispersion to form a layer of increased hybrid particle density, relative to the hybrid particle density of the dispersion, at the upper surface of the volume of colloidal dispersion.

In one embodiment, the liquid medium of the colloidal dispersion of hybrid particles phase is a continuous phase, the second liquid phase is a discontinuous phase dispersed in the liquid medium of the colloidal dispersion, and interfaces between the colloidal dispersion and the second liquid phase are defined at the surfaces of dispersed droplets of the second liquid phase in the liquid medium of the colloidal dispersion. In such a case, the hybrid particles tend to adsorb at the surfaces of the droplets of the second liquid phase to form an interlayer of increased hybrid particle density, relative to the hybrid particle density of the dispersion, at the interfaces between the liquid medium of the colloidal dispersion and each of the dispersed droplets of the second liquid phase. In one embodiment, the colloidal dispersion, dispersed droplets of second liquid phase, and hybrid particle interlayers form a liquid/liquid emulsion. In one embodiment, the hybrid particle layers stabilize the liquid/liquid emulsion.

In one embodiment, the second liquid phase is a continuous phase, the liquid medium of the colloidal dispersion of hybrid particles phase is a discontinuous phase dispersed in the second liquid phase, and interfaces between the colloidal dispersion and the second liquid phase are defined at the surfaces of dispersed droplets of the colloidal dispersion in the second liquid phase. In such a case, the hybrid particles tend to adsorb at the surfaces of the droplets of the colloidal dispersion to form an interlayer of increased hybrid particle density, relative to the hybrid particle density of the dispersion, at the interfaces between the second liquid phase and each of the droplets of the colloidal dispersion. In one embodiment, the second liquid phase, dispersed droplets of colloidal dispersion, and hybrid particle interlayers form a liquid/liquid emulsion. In one embodiment, the hybrid particle layers stabilize the liquid/liquid emulsion.

In one embodiment of the adsorption method of the present invention, the second phase is a solid.

Solids suitable as the second phase include water insoluble solids and solids having sufficiently limited water solubility to provide an interface with the colloidal dispersion of hybrid particles that is substantially stable during the time scale within which the adsorption process is conducted, and include, for example, metals, glasses, ceramics, organic polymers, and organosilicone polymers.

In one embodiment, the liquid medium of the colloidal dispersion of hybrid particles and the solid phase are each continuous phases that interface at least one surface of the solid phase. Hybrid particles of the hybrid dispersion tend to adsorb at interface with the solid phase to form a layer of increased hybrid particle density, relative to the hybrid particle density of the dispersion, on the surface of the solid.

In one embodiment, a combination of adsorption processes is used wherein:
(a) a layer of hybrid particles is formed at the surface of a volume of a dispersion of the hybrid particles by the adsorption process described above in regard to the case of an interface between a colloidal dispersion having a continuous liquid phase and a continuous gas phase or continuous second liquid phase and
(b) a substantially flat surface of solid substrate is drawn through the layer of hybrid particles with the surface of the substrate oriented substantially perpendicularly to the layer of hybrid particles, to form a layer of hybrid particles on the surface of the substrate.

In one embodiment:
(a) a layer of hybrid particles is formed at the air interface at the upper surface of a volume of a dispersion of the hybrid particles in a reservoir by the adsorption process described above in regard to the case of an interface between a colloidal dispersion having a continuous liquid phase and a continuous gas phase, and
(b) a substantially flat surface of solid substrate is initially submerged below the upper surface of the colloidal dispersion and then upwardly withdrawn from the colloidal dispersion and through the layer of hybrid particles on the upper surface of the colloidal dispersion with the surface of the substrate oriented substantially perpendicularly to the upper surface of the colloidal dispersion and layer of hybrid particles, to form a layer of hybrid particles on the surface of the substrate.

The adsorption occurs at the intersection of the colloidal dispersion/air interface and the colloidal dispersion/solid surface.

In one embodiment, the substrate is an organic polymer, organosilicone polymer, ceramic, metal, or composite material. Suitable organic polymers include, for example, polyolefins, such as polyethylene, polypropylene, and polystyrene, polyacrylates, such as polymethylmethacrlate, and halogenated polymers, such a polytetrafluoroethylene. Suitable organosilicone polymers include, for example, polydimethylsiloxane. Suitable ceramics include, for example, alumina, zirconia, silica, silicone carbide, silicon nitride. Suitable metals include copper, platinum, paladium, gold. Suitable composites include, for example, fiber or particle reinforced polymers, such as silica filled ethylene propylene diene rubber, and metal particulate-filled polymers.

The substrate may be of any physical configuration, such as a shaped article, including for example, fibers, flat or shaped sheets, hollow tubes, spheres.

In one embodiment, the layer of hybrid particles on the surface of the substrate is a monolayer. As used herein in reference to hybrid particles, the term "monolayer" of means a layer that is one particle thick.

In one embodiment, the layer of hybrid particles on the surface of the substrate is a discontinuous layer of particles. As used herein in reference to a layer of hybrid particles, the term "discontinuous" means that the layer includes regions of void space defined between discrete hybrid particles and/or between regions of more closely packed hybrid particles.

In one embodiment, the layer of hybrid particles on the surface of the substrate is an at least substantially continuous layer of particles. As used herein in reference to a monolayer of hybrid particles, the term "continuous" means that the particles of the layer are so closely packed that a typical particle of the layer is substantially surrounded by and in contact with other particles of the layer.

In one embodiment, the layer of hybrid particles on the surface of the substrate is an at least substantially continuous monolayer of hybrid particles, wherein a typical hybrid particle of the monolayer is substantially surrounded by and in contact with other particles of the monolayer.

EXAMPLE 1

Hybrid particles having a cerium oxide core and an organic layer comprising one or more phosphonates were made.

As synthesized, the cerium oxide particles are in the form of an aqueous nanosol that is stabilized by combination of long range electrostatic forces and short range hydration interactions at pH 1.5. The nanoceria particles were isotropic agglomerates of 2-5 crystallites with a typical size of 2 nm and faceted morphologies, with an average radius determined by cryogenic transmission electron microscopy (cryo-TEM) of 7 nm, with a polydispersity of 0.15. An increase of the pH or ionic strength (>0.45 M) resulted in a reversible aggregation of the particles, leading eventually to a macroscopic phase separation. The destabilization of the sols occurs well below the point of zero charge of the ceria particles, pzc=7.9 (as reported by Nabavi M. et al. J. Coll. Int. Sci. 160, 459, 1993). The bare nanoceria particles have a zeta potential $\zeta$=+30 mV and an estimated structural charge of $Q_{CeO_2}$=+300 e.

In each case, the organic layer of the hybrid particles was derived at least in part from 3-phosphonopropyl alcohol ethoxylate-10 EO ("PPEG"), that is, a phosphonate according to the structure (I), wherein:

$R^1$ and $R^2$ are each H,
$R^3$ is trimethylene,
$R^5$ is H,
$R^6$ is H, and
m is 0 and n is 10.

Titration curves with NaOH (1M) show the presence of two distinct pKas for PPEG at $pKa_1$=2.7 and $pKa_2$=7.8.

In some of the of the hybrid particles of the Examples, the organic layer of the hybrid particles was derived from a mixture of PPEG and 3-phosphonopropyl alcohol ethoxylate cetyl-10 EO ("Cetyl-PPEG"), that is a phosphonate according to structure (I), wherein:

$R^1$ and $R^2$ are each H,
$R^3$ is trimethylene,
$R^5$ is H,
$R^6$ is cetyl, and
m is 0 and n is 10

The critical micelle concentration of Cetyl-PPEG was found to be between 0.05 mM and 0.1 mM in pure water (light scattering), and at 7.3 mM in a mixture of ethanol/water (50/50 vol/vol) by conductivity measurements.

In each case, the pH of the phosphonate solution was adjusted with reagent-grade nitric acid ($HNO_3$) to 1.5. Mixed solutions of cerium oxide nanoparticles and phosphonates were prepared by simple mixing of dilute solutions prepared at the same concentration c (c=0.1-1 wt. %) and same pH. The relative amount of each component is monitored by the volume ratio X, yielding for the final concentrations:

$$c_{CeO_2} = \frac{cX}{1+X}, \quad c_{oligomer} = \frac{c}{1+X}. \quad (1)$$

Ammonium hydroxide ($NH_4OH$) is used to adjust the pH of hybrid particle dispersions in the range of 1.5 to 10.

FIG. 1a shows a schematic representation of the surface chemistry of cerium oxide nanoparticles: cationic protonated hydroxyl groups versus neutral hydroxyl groups, FIG. 1b shows tailored PPEG chemical architectures for the adsorption onto nanoparticles, and FIG. 1c shows a PPEG corona around the nanoparticle, illustrating steric stabilization and PEG functionality.

Figure 2A:
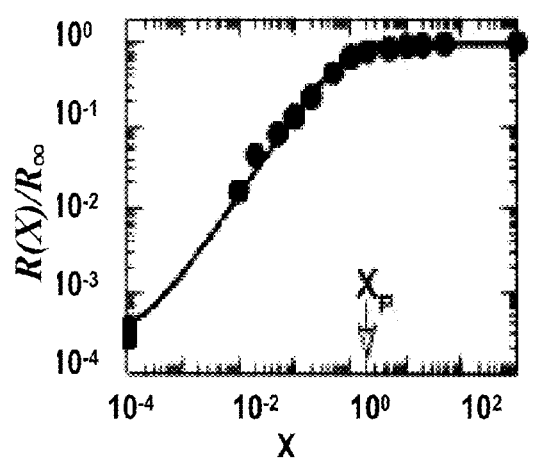
Figure 3:
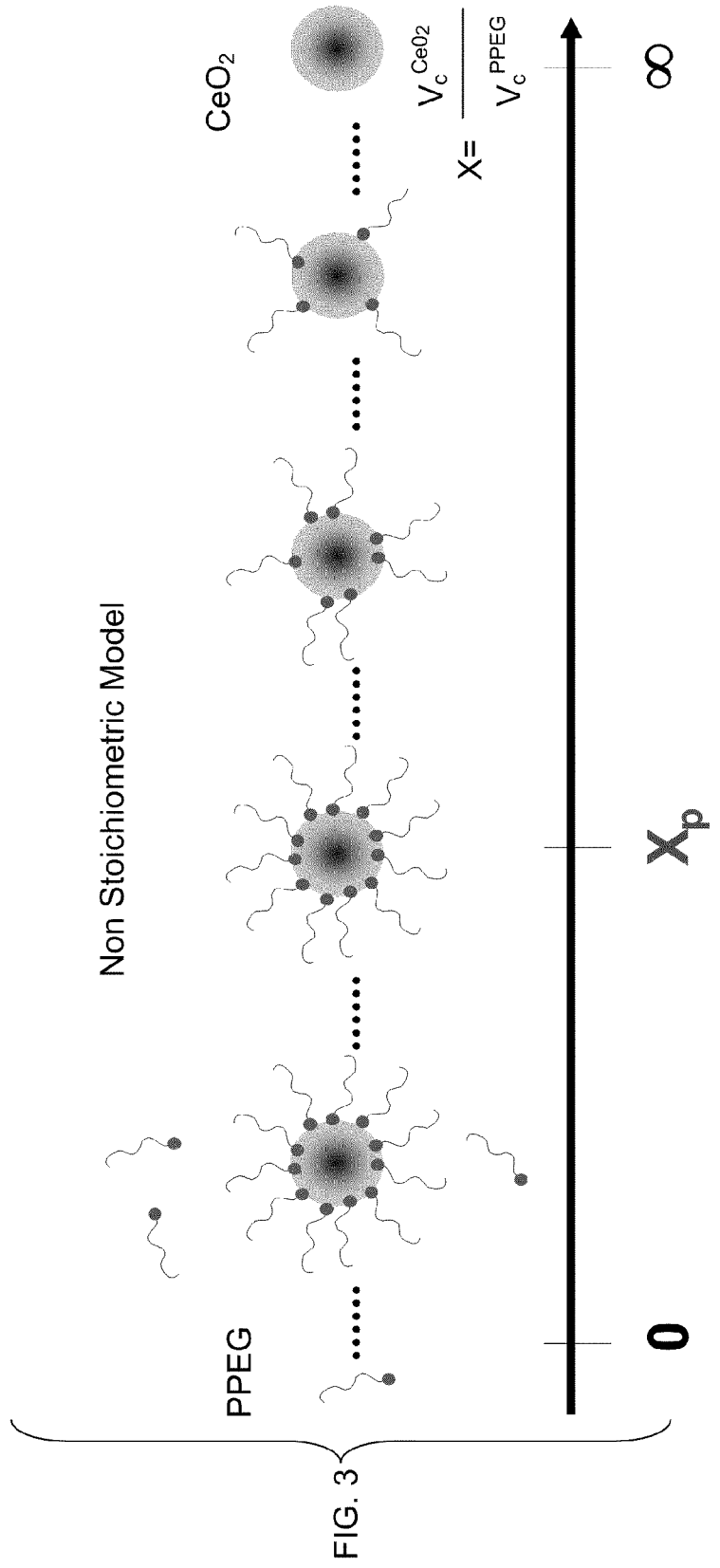
FIG. 3 shows a schematic representation for the non-stoichiometric adsorption mechanism of PPEG onto nanoceria particles.

Static and dynamic light scattering (SLS and DLS) was used to investigate the microstructure and stability of the electrostatic particles in bulk solutions. With an overall concentration c kept constant, the Rayleigh ratios and hydrodynamic diameters are measured and plotted versus the mixing ratio X (FIG. 2a and FIG. 2b, respectively). $X=10^{-4}$ corresponds to a solution containing only PPEG oligomers and X=1000 corresponds to a solution containing only bare nanoceria particles. When X decreases from 1000 to 0.01, the size of the coated nanoceria increases gradually up to a critical value noted $X_p$ where it then saturates around $D_H$=13 nm. We interpret this result as the progressive coating of the particles by the oligomers until full coverage occurring at $X_p$, which can be fitted with a non-stoichiometric adsorption model (NST) (FIG. 3). Below the critical volume ratio $X_p$, the particles are fully covered and in equilibrium with a decreasing number of non-absorbed oligomers. Above $X_p$, the number of grafted oligomers progressively decreases toward bare particles ($X=\infty$). At $X_p$, all the oligomers present in the initial solution are adsorbed onto the particle. The normalized Rayleigh ratio (normalization by the Rayleigh ratio of the bare nanoceria $R_{NP}$ ($X=\infty$)), as measured by SLS, is also monitored as a function of X. Here as well, one can clearly identify a critical ratio X equal to $X_p$ where the Rayleigh ratio starts to decrease progressively with X. We interpret this result as the dilution of the fully covered particles by the free oligomers present in the bulk, in agreement with DLS results.

Figure 4:
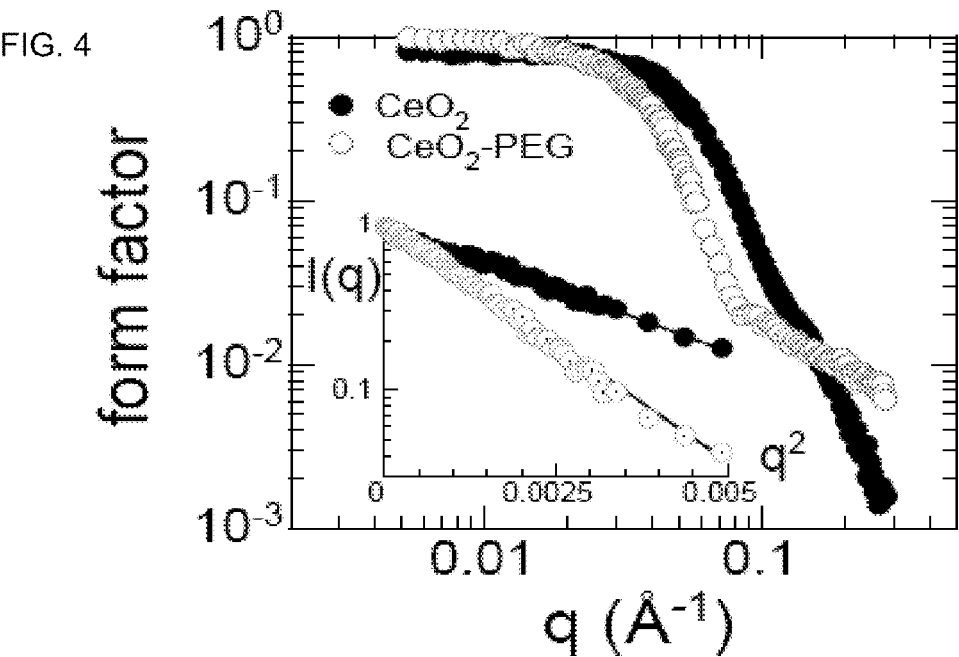
FIG. 4 shows the SANS form factor P (q) for bare and coated nanoparticles. Inset: Guinier representation of the intensity for the same samples (I(q) versus $q^2$).

Neutron scattering was performed in $H_2O$ and $D_2O$ for the $CeO_2$ and PPEG-$CeO_2$ system respectively. FIG. 4 shows the SANS form factor of both bare and modified particles. The extra contribution to the scattered intensity due to the presence of the organic layer is clearly seen at low q in the Guinier representation where $R_g q<1$ (inset FIG. 4), where we can deduce a radius of gyration $R_g$=3.2±0.1 nm for the bare nanoparticles and $R_g$=4.4±0.1 nm for the PPEG coated ones.

Figure 5:
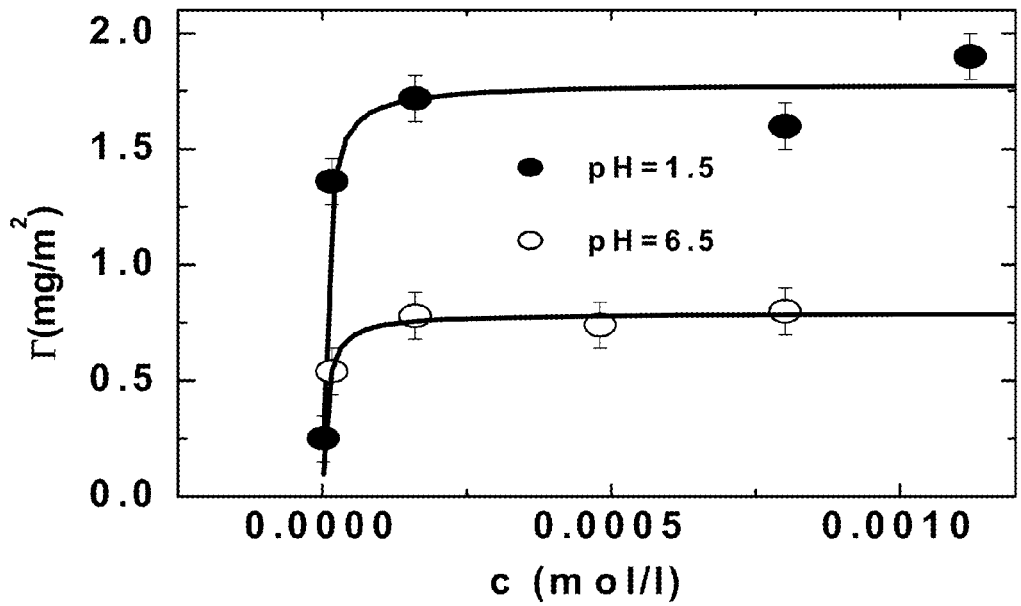
FIG. 5 shows adsorption isotherms of PPEG oligomers onto model $CeO_2$-coated substrates at low pH (1.5) and neutral pH (6). The solid curve is the Langmuir fit to the data.

In order to evaluate the affinity of PPEG with the surface of cerium oxide nanoparticles, adsorption isotherms are measured on macroscopically flat $CeO_2$ model surfaces with the help of optical reflectometry. As seen in FIG. 5 at both investigated pH, the curves present a rather sharp increase of the adsorbed amount at very low concentration. This rapid flattening out of the adsorbed amount suggests a rather high affinity of the oligomers toward cerium oxide surface. The data of FIG. 5 can be fitted using a Langmuir model (see Nabavi M. et al. J. Coll. Int. Sci. 160, 459, 1993) and the adsorption free energies $\Delta G^{ads}$ are found to be $-16 k_B T$ and $-15.8 k_B T$ for pH=1.5 and pH=6.5 respectively. Though the exact nature of the bond between PPEG and ceria is not known at this stage, the measured free energies might indicate an adsorption mechanism controlled by electrostatic interaction (see Studart, A. R. et al. Langmuir, 23, 1081, 2007).

EXAMPLE 2

Figure 6B:
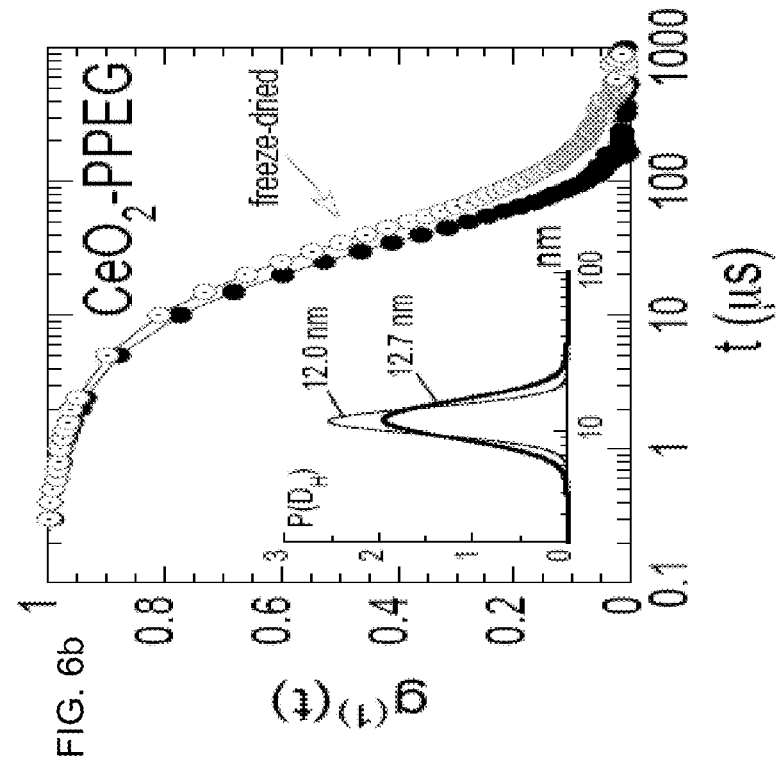
FIGS. 6a and 6b show re-dispersion in aqueous solutions of $CeO_2$ and PPEG-$CeO_2$ powders obtained by freeze-drying both stock solutions. In particular.
Figure 6A:
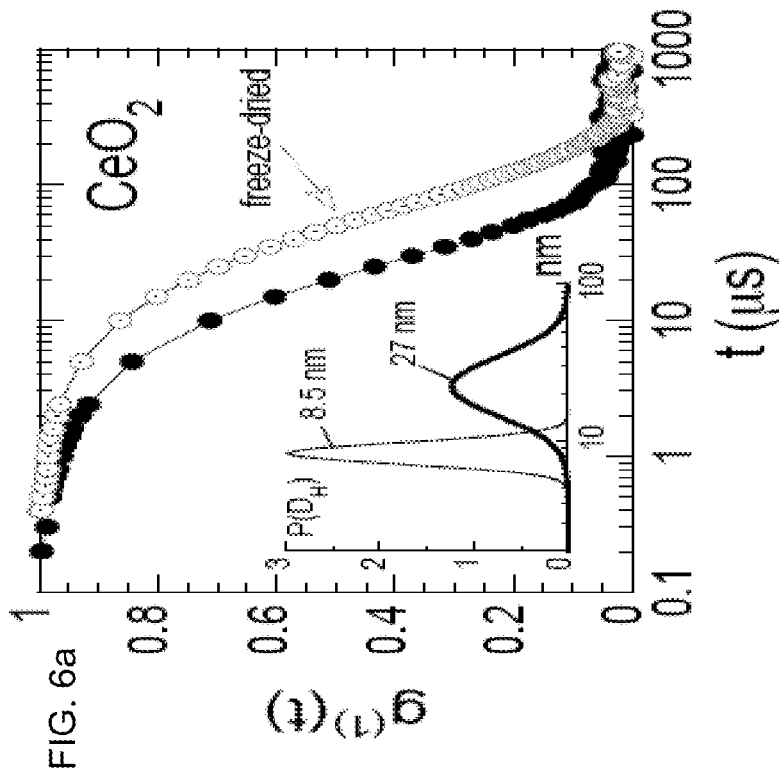

Bare and hybrid nanoceria solutions were freeze-dried then re-dispersed in aqueous solutions at pH=1.5 for bare particles and DI water for stabilized particles and stirred overnight. FIGS. 6a and 6b show the correlation functions measured with DLS (at 90°) of the original and modified sol before and after re-dispersion. The distributions P(D) of the hydration diameters $D_H$ are also shown in FIGS. 6a and 6b. After re-dispersion, the correlation function of the bare $CeO_2$ solution is clearly shifted toward longer times. As a result, the mean $D_H$ is shifted toward larger values together with a clear broadening of the distribution compared to that of the original solution. In the case of passivated PPEG-$CeO_2$ particles, the freeze-drying process did not significantly change the original distribution indicating no change in the surface complexation of PPEG during the drying process. This has clear implications for the utility of nanoceria providing cost and processing advantages. In addition, the hybrid metal oxide powder is also re-dispersible in certain organic solvents like ethanol, acetone or chloroform which is not the case for bare particles. FIGS. 6a and 6b show re-dispersion in aqueous solutions of CeO$_2$ and PPEG-CeO$_2$ powders obtained by freeze-drying both stock solutions. FIG. 6a shows original sol before and after freeze-drying and re-dispersion and FIG. 6b id. hybrid sol. (X<X$_p$). The complexation of nanoceria with end-functional PPEG to create true redispersible nanopowders in aqueous or certain organic solvents provides the framework for designing a truly versatile hybrid metal oxide sol with clear utility in a range of applications. Finally, UV-visible measurements have shown that the presence of the organic layer does not affect (via possible metal-ligands charge transfer particles) the well known UV absorbance properties of bare particles.

The complexation of nanoceria with end-functional PPEG to create true redispersible nanopowders in aqueous or certain organic solvents provides the framework for designing a truly versatile hybrid metal oxide sol with clear utility in a range of applications. Finally, UV-visible measurements have shown that the presence of the organic layer does not affect (via possible metal-ligands charge transfer complexes) the well known UV absorbance properties of bare particles. This result has direct impact for applications where anti-UV protection is needed.

EXAMPLE 3

Figure 7:
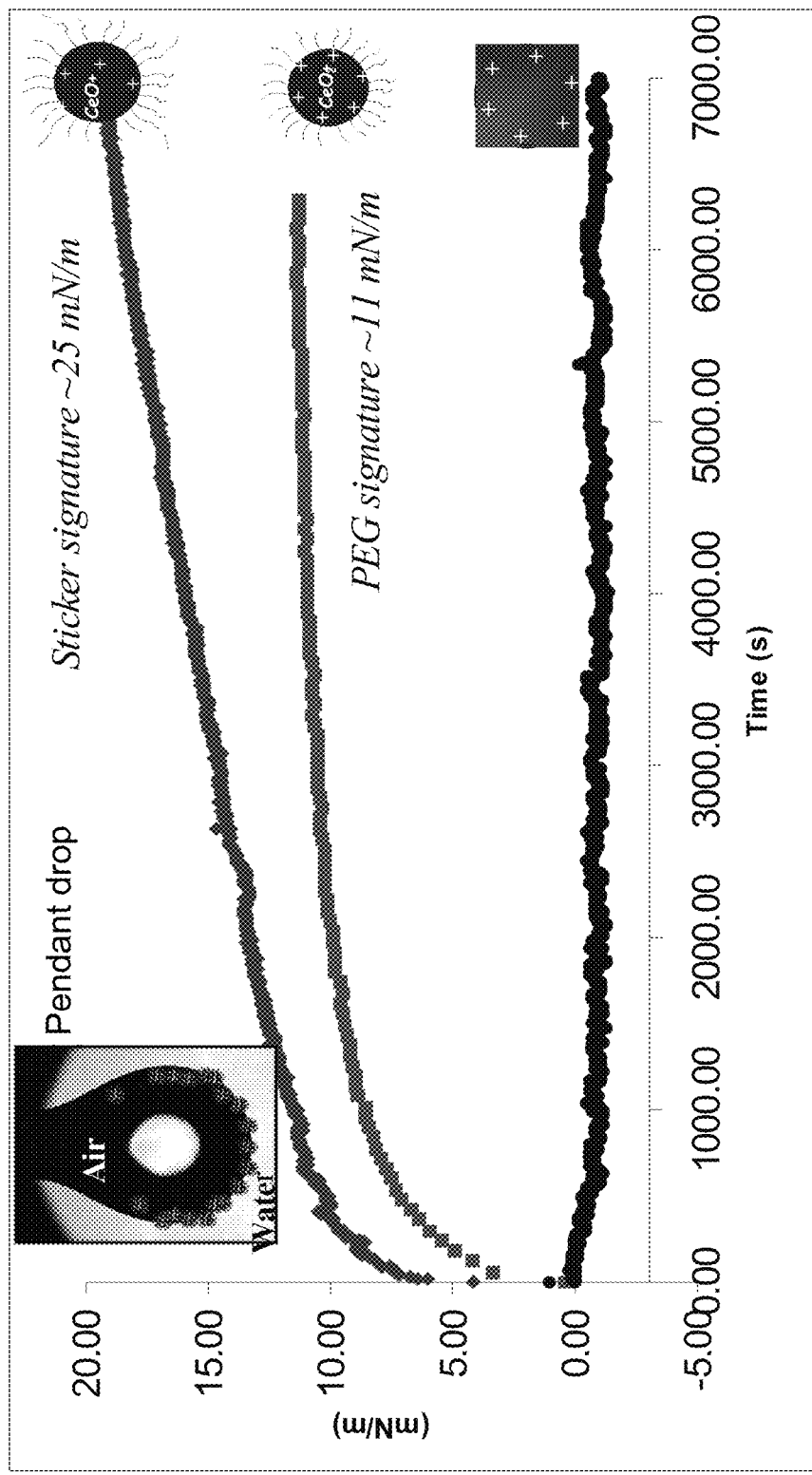
FIG. 7 shows pendant drop measurements monitor the evolution of the interfacial pressure $\pi = \gamma_{water/air} - \gamma_{solution/air}$.

Pendant drop experiments performed on diluted (0.1% wt) aqueous solutions of nanoparticles show that the presence of the PEG layer confers some interfacial activity to the original nanoparticles, as can be seen in FIG. 7. The bare charged CeO$_2$ nanoparticles do not adsorb to air/water interface (slight depletion likely due to image forces); while functionalized nanoparticles do adsorb, reducing the interfacial energy in agreement with the known PEG surface pressure (~10 nm/m); with a small fraction (1% wt) of hydrophobic sticker added during the formulation, the surface tension is further reduced highlighting the possibility of tuning the interfacial energy via cetyl-PPEG content. Due to their surface activity, monolayers are formed at the air/water interface of a Langmuir trough enabling the formation of multilayers onto solid surfaces as seen in FIGS. 8a and 8b.

Figure 9A:
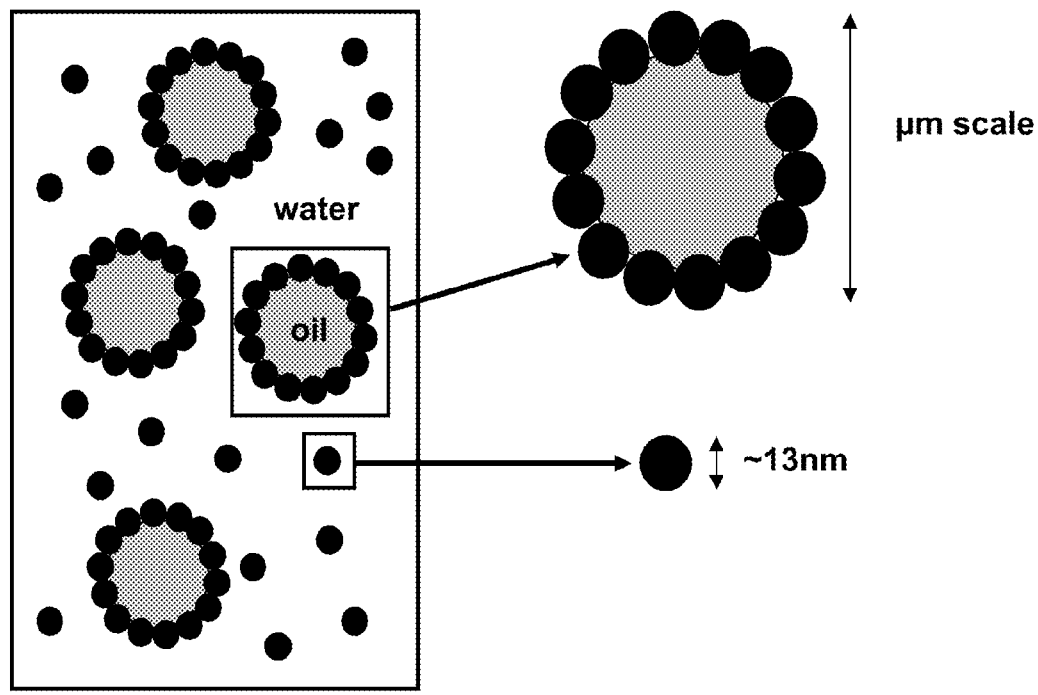
FIGS. 9a and 9b, respectively, schematically and actually show a Pickering emulsion of water/hexadecane by adding PEG functionalized nanoceria.
Figure 9B:

PEG functionalized nanoparticles were also shown to be good Pickering emulsion agents as seen schematically and actually, respectively, in FIGS. 9a and 9b, inhibiting the coalescence of the (water/hexadecane) emulsion droplets. Compared to micron-sized particles, nanoparticles display a constant particle exchange at the interface, leading the nanoparticle assembly to attain its equilibrium (see Bouker A. et al. Soft Matter 3, 231, 2007).

For hybrid nanoparticles with a small fraction of hydrophobic cetyl-PPEG, it was shown that their interaction can be tuned by via the solvent surface tension.

Figure 11:
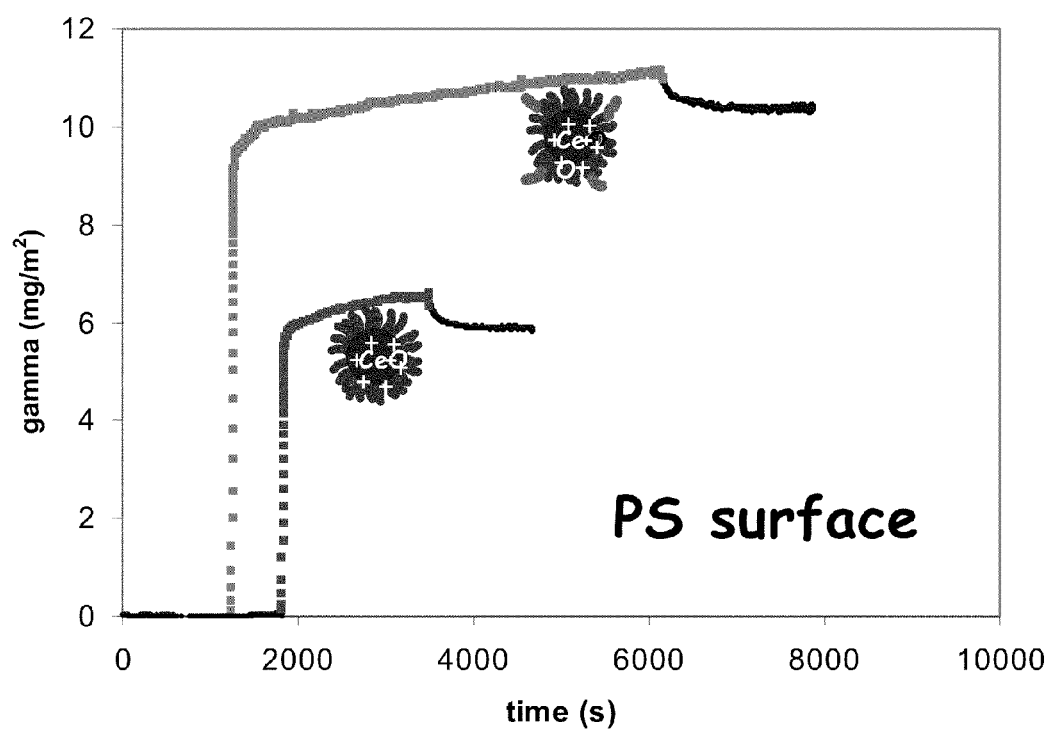
FIG. 11 shows adsorption of PPEG/Cetyl-PPEG (99/1 wt/wt) functionalized nanoparticles onto polystyrene surfaces monitored by optical reflectometry.

DLS experiments were performed on PPEG/(95/5 wt/wt) functionalized nanoceria. The evolution of the mutual diffusion coefficient D vs concentration c was plotted in FIG. 10a. It can be seen that at higher ethanol content (E/W=50/50), the second virial coefficient A$_2$ (~slope of D vs. c) is positive indicating a slight repulsion between the particles; at lower ethanol content (E/W=40/60), A$_2$ becomes negative suggesting a slight attraction. In the latter case the steric repulsion provided by the PEG chains is balanced by a larger hydrophobic (attractive) interaction provided by the cetyl-PPEG. FIG. 10b schematically shows this change of the nature of solvent. This simple route can likely be used to create supracolloidals assemblies. Their affinity for hydrophobic solid surfaces was further evaluated by reflectometry. It is shown in FIG. 11 that the presence of a small quantity of Cetyl-PPEG in the layer can double the adsorbed amount onto a polystyrene surface.

The invention claimed is:

1. An adsorption method, comprising adsorbing a monolayer of hybrid particles from a colloidal dispersion of such particles at an interface between the dispersion and a second phase, said hybrid particles comprising:
   (a) a nanoscale inorganic particle core having an outer surface, and
   (b) an organic layer disposed on at least a portion of the surface of the inorganic particle core and comprising one or more phosphonates according to structure (I):

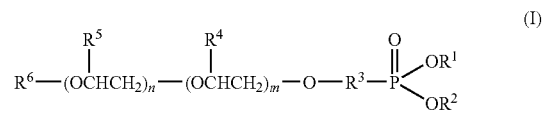

(I)

wherein:
   $R^1$ and $R^2$ are each independently H, or a $(C_1\text{-}C_{20})$ hydrocarbon group,
   $R^3$ is a divalent $(C_1\text{-}C_{20})$ hydrocarbon group,
   $R^4$ and $R^5$ are each independently H or $(C_1\text{-}C_2)$ alkyl, provided that $R^4$ differs from $R^5$,
   $R^6$ is H or a $(C_1\text{-}C_{30})$ hydrocarbon group,
   m and n are each independently integers of from 0 to about 200, provided that the sum of m+n is at least 1,
   wherein the nanoscale inorganic particle core consists of a single nanoscale inorganic particle, respectively.

2. The method of claim 1, wherein the second phase is a gas phase.

3. The method of claim 1, wherein the second phase is a liquid phase that is immiscible with the colloidal dispersion.

4. The method of claim 1, wherein the second phase is a solid phase.

5. An article, comprising:
   (a) a substrate having a surface, and
   (b) a monolayer of hybrid particles adsorbed on at least a portion of the surface of the substrate, said hybrid particles comprising:
      (i) a nanoscale inorganic core having an outer surface, and
      (ii) an organic layer disposed on at least a portion of the surface of the inorganic core and comprising one or more phosphonates according to structure (I):

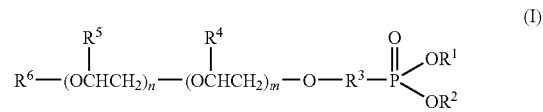

(I)

wherein:
   $R^1$ and $R^2$ are each independently H, or a $(C_1\text{-}C_{20})$ hydrocarbon group,
   $R^3$ is a divalent $(C_1\text{-}C_{20})$ hydrocarbon group,
   $R^4$ and $R^5$ are each independently H or $(C_1\text{-}C_2)$ alkyl, provided that $R^4$ differs from $R^5$,
   $R^6$ is H or a $(C_1\text{-}C_{30})$ hydrocarbon group,
   m and n are each independently integers of from 0 to about 200, provided that the sum of m+n is at least 1, wherein the nanoscale inorganic particle core consists of a single nanoscale inorganic particle, respectively.

6. An emulsion, comprising:
(a) two immiscible fluid phases, wherein one of said phases is a continuous phase and the other of said phases is a discontinuous phase comprising two or more discrete portions, each bounded by an interface between the portion and the continuous phase and each dispersed in the continuous phase,
(b) hybrid particles dispersed in one of the fluid phases at a first average density and disposed as a monolayer of the hybrid particles at the interfaces between the two phases in a second average density, said second average density being higher than said first average density and said hybrid particles comprising:
(i) a nanoscale inorganic core having an outer surface, and
(ii) an organic layer disposed on at least a portion of the surface of the inorganic core and comprising one or more phosphonates according to structure (I):

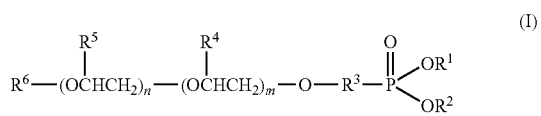

wherein:
$R^1$ and $R^2$ are each independently H, or a $(C_1-C_{20})$ hydrocarbon group,
$R^3$ is a divalent $(C_1-C_{20})$ hydrocarbon group,
$R^4$ and $R^5$ are each independently H or $(C_1-C_2)$ alkyl, provided that $R^4$ differs from $R^5$,
$R^6$ is H or a $(C_1-C_{30})$ hydrocarbon group,
m and n are each independently integers of from 0 to about 200, provided that the sum of m+n is at least 1,
wherein the nanoscale inorganic particle core consists of a single nanoscale inorganic particle, respectively.

7. The emulsion of claim 6, wherein one of the two fluid phases is an aqueous phase and the other of the two fluid phases is a water immiscible liquid phase.

8. The emulsion of claim 6, wherein one of the two fluid phases is an aqueous phase and the other of the two fluid phases is a gas phase.

9. The emulsion of claim 6, wherein the continuous phase is an aqueous phase.

10. The emulsion of claim 6, wherein the discontinuous phase is an aqueous phase.

11. The method of claim 1, wherein:
(a) a layer of hybrid particles is formed at a surface of a volume of said dispersion of hybrid particles by adsorption; and
(b) a substantially flat surface of solid substrate is drawn through the layer of hybrid particles with the surface of the substrate oriented substantially perpendicularly to the layer of hybrid particles, to form said monolayer of hybrid particles on the surface of the substrate.

12. The method of claim 1, wherein:
(a) said interface is an air interface of air and an upper surface of a volume of said colloidal dispersion of the hybrid particles in a reservoir, said monolayer of hybrid particles is formed by adsorption at the air interface at the upper surface of said volume of said dispersion of the hybrid particles in said reservoir, and
(b) a substantially flat surface of solid substrate is initially submerged below the upper surface of the colloidal dispersion and then upwardly withdrawn from the colloidal dispersion and through the layer of hybrid particles on the upper surface of the colloidal dispersion with the surface of the substrate oriented substantially perpendicularly to the upper surface of the colloidal dispersion and layer of hybrid particles, to form a layer of hybrid particles on the surface of the substrate by adsorption.

13. The method of claim 1, wherein the substrate is selected from the group consisting of an organic polymer, organosilicone polymer, ceramic, metal, and composite material.

14. The method of claim 1, wherein the substrate is selected from the group consisting of polyethylene, polypropylene, polystyrene, polymethylmethacrylate, and polytetrafluoroethylene.

15. The method of claim 1, wherein the substrate is organosilicone polymer.

16. The method of claim 1, wherein the substrate is selected from the group consisting of alumina, zirconia, silica, silicone carbide, silicon nitride.

17. The method of claim 1, wherein the substrate is selected from the group consisting of copper, platinum, palladium, and gold.

18. The method of claim 1, wherein the substrate is selected from the group consisting of fiber reinforced polymers and particle reinforced polymers.

19. The method of claim 1, wherein the substrate is a shaped article selected from the group consisting of fibers, sheets, hollow tubes, and spheres.

20. The method of claim 1, wherein the substrate is solid and the monolayer consists of the hybrid particles.

21. The method of claim 1, wherein the substrate is liquid and the monolayer consists of the hybrid particles.

22. The method of claim 1, wherein the inorganic particles comprise quantum dots.

23. The method of claim 1 wherein the nanoscale inorganic particle core consists of a single nanoscale cerium oxide particle, respectively.

24. The article of claim 5, wherein the nanoscale inorganic particle core consists of a single nanoscale cerium oxide particle, respectively.

25. The emulsion of claim 6, wherein the nanoscale inorganic particle core consists of a single nanoscale cerium oxide particle, respectively.

* * * * *